United States Patent
Jensen et al.

(10) Patent No.: US 12,275,473 B2
(45) Date of Patent: Apr. 15, 2025

(54) MOBILE ROBOT WITH ADJUSTABLE TRACTION WEIGHTS

(71) Applicant: MOBILE INDUSTRIAL ROBOTS A/S, Odense S (DK)

(72) Inventors: Lasse Bak Elleskov Jensen, Broby (DK); Lars Hjorth Hansen, Tommerup (DK)

(73) Assignee: MOBILE INDUSTRIAL ROBOTS A/S, Odense S (DK)

( * ) Notice: Subject to any disclaimer, the term of this patent is extended or adjusted under 35 U.S.C. 154(b) by 303 days.

(21) Appl. No.: 17/764,403

(22) PCT Filed: Sep. 28, 2020

(86) PCT No.: PCT/EP2020/077056
§ 371 (c)(1),
(2) Date: Mar. 28, 2022

(87) PCT Pub. No.: WO2021/063864
PCT Pub. Date: Apr. 8, 2021

(65) Prior Publication Data
US 2022/0363329 A1 Nov. 17, 2022

(30) Foreign Application Priority Data
Oct. 1, 2019 (EP) ..................................... 19200798

(51) Int. Cl.
*B62D 63/04* (2006.01)
*B62D 61/10* (2006.01)
(52) U.S. Cl.
CPC ............. *B62D 63/04* (2013.01); *B62D 61/10* (2013.01)
(58) Field of Classification Search
CPC ................................ B62D 63/04; B62D 61/10
See application file for complete search history.

(56) References Cited

U.S. PATENT DOCUMENTS

| 7,066,291 | B2 | 6/2006 | Martins et al. |
| 11,287,824 | B2 | 3/2022 | Jacobsen et al. |

(Continued)

FOREIGN PATENT DOCUMENTS

| AT | 306537 B | 4/1973 |
| AU | 3389371 A | 3/1973 |

(Continued)

OTHER PUBLICATIONS

International Preliminary Report on Patentability for International Patent Application No. PCT/EP2020/077056, mailed Apr. 5, 2022, 7 pages.

(Continued)

*Primary Examiner* — Brian L Swenson
(74) *Attorney, Agent, or Firm* — ArentFox Schiff LLP

(57) ABSTRACT

The present invention relates to a basic mobile robot (1) where the weight on the drive wheels (6) can be adjusted in order to achieve the optimal traction and braking performance of the mobile robot (1) for the relevant application. With the inventive design of the bogie arm (4) and the modular traction weights (9), the gravitation forces and resulting friction acting on the drive wheels (6) can be increased by attaching one or more traction weight modules (13) to the bogie arm extensions (12), while due to the cantilever effect, the resulting gravitation forces acting on the (front) caster wheels (7) are decreased. Thus, making it relatively easy to achieve just enough traction on the drive wheels (6) for the intended application, without compromising safety and with a minimum impact on the overall energy efficiency of the mobile robot (1). The mobile robot (1) is configurable for different applications including transportation of goods loaded on top of the mobile robot (1), cart pulling or automated hauling of materials indoors.

18 Claims, 5 Drawing Sheets

(56) References Cited

U.S. PATENT DOCUMENTS

| | | | |
|---|---|---|---|
| 2003/0159871 A1* | 8/2003 | Hurlburt | B62D 7/10 |
| | | | 180/209 |
| 2004/0093650 A1 | 5/2004 | Martins et al. | |
| 2019/0233028 A1 | 8/2019 | Tengvert et al. | |
| 2019/0294175 A1* | 9/2019 | Pajevic | G05B 19/416 |
| 2019/0384314 A1 | 12/2019 | Jacobsen | |
| 2020/0004247 A1 | 1/2020 | Jacobsen et al. | |
| 2022/0258327 A1* | 8/2022 | Bangalore Srinivas | |
| | | | B62D 63/04 |
| 2022/0363329 A1* | 11/2022 | Jensen | B62D 61/10 |
| 2023/0043531 A1* | 2/2023 | Haagaard | B25J 9/0009 |
| 2023/0211989 A1* | 7/2023 | Bangalore | B66F 9/07554 |
| | | | 187/222 |
| 2024/0042845 A1* | 2/2024 | Cederwall | B62D 63/02 |

FOREIGN PATENT DOCUMENTS

| | | |
|---|---|---|
| CN | 202765007 U | 3/2013 |
| CN | 203332260 U | 12/2013 |
| CN | 203332264 U | 12/2013 |
| CN | 105151069 A | 12/2015 |
| CN | 205836515 U | 12/2016 |
| CN | 207028815 U | 2/2018 |
| CN | 207029362 U | 2/2018 |
| CN | 207955654 U | 10/2018 |
| CN | 108725626 A | 11/2018 |
| CN | 208774905 U | 4/2019 |
| CN | 209192048 U | 8/2019 |
| JP | H03186468 A | 8/1991 |
| WO | 2016165721 A1 | 10/2016 |

OTHER PUBLICATIONS

International Search Report for International Patent Application No. PCT/EP2020/077056, mailed Apr. 8, 2021, 4 pages.
Written Opinion for International Patent Application No. PCT/EP2020/077056, mailed Apr. 8, 2021, 6 pages.
MIR 500 User Guide. Mobile Industrial Robots A/S. Odense, S0. (Sep. 2019). V 1 3, (pp. 1-100). 100 pages.
MIR 100 User Guide. Mobile Industrial Robots A/S. Odense, S0. (Aug. 2018). V. 1.1, (pp. 1-42). 44 pages.
MIR 100 User Guide. Mobile Industrial Robots A/S. Odense, S0. (Nov. 2017). V. 1.0, (pp. 1-37). 39 pages.
Mobile Industrial Robots, MiRFleet, Reference Guide, v.1.0, 32 pages (Jan. 2017).
Communication pursuant to Article 94(3) EPC for European Patent Application No. 19200798.7, issued Nov. 4, 2022, (6 pages).
Office Action in Chinese Application No. 202080069091.8 dated Feb. 8, 2024, with English translation, 13 pages.
File History of EP Patent No. 3800117, downloaded Oct. 1, 2024. 141 pages.
Chinese Second Office Action mailed Sep. 7, 2024, for Application No. CN202080069091.8. English translation attached. 21 pages.
File History of EP Patent No. 3800113, downloaded Oct. 1, 2024. 141 pages.
Chinese Office Action issued for Application No. CN202080069091.6, mailed Dec. 5, 2024 (w/ machine translation). 13 pages.

* cited by examiner

MOBILE ROBOT WITH ADJUSTABLE TRACTION WEIGHTS

CROSS-REFERENCE TO RELATED APPLICATIONS

This application is a U.S. national stage entry of PCT Application No. PCT/EP2020/077056, which was filed on Sep. 28, 2020. PCT Application No. PCT/EP2020/077056 claims priority to European Patent Application No. EP19200798.7, which was filed on Oct. 1, 2019. This application claims priority to PCT Application No. PCT/EP2020/077056 and to European Patent Application No. EP19200798.7. The contents of PCT/EP2020/0795 and European Patent Application No. EP19200798.7 are incorporated herein by reference.

FIELD OF INVENTION

The present invention relates to a basic mobile robot, which is configurable for different applications including transportation of goods loaded on top of the mobile robot, cart pulling or automated hauling of materials indoors. More specifically, the invention relates to a mobile robot where the weight on the drive wheels can be adjusted to achieve the optimal traction and braking performance of the mobile robot for the relevant application.

BACKGROUND OF INVENTION

The transportation of articles within a structure, or between multiple structures has posed, to some degree, a problem. Many transportation options exist today as commercially available products, for example, conveyer belts, pneumatic tubes, gimbaled carts, and mobile robots. Mobile robots, or Autonomous Guided Vehicles (AGV's), are vehicles that have been equipped with a drive system under computer control which allows autonomous guidance between two locations.

Towing trailers with a mounted towing apparatus on AGV's are well known in the art. Commonly a commercial hitch and ball are mounted at one end of the AGV, usually the rear, whereat a trailer comprising a releasable socket and tow bar is connected.

Robotic and automated vehicles for delivering or transporting material indoors have been developed and utilized in several applications. One well-known application is the automated mail delivery vehicles and robots.

Patent application US2004093650A1 (and corresponding patent US7066291B2) discloses a mobile robot system for performing a plurality of separate operations comprising at least one autonomous wheeled mobile robot having at least one wheel-driving motor, an on-board computer; means for navigation, orientation, and maneuvering in an environment with moving obstacles; a sensor system; and a wireless communication system for receiving and sending signals. The mobile robot system disclosed in US2004093650/US7066291B2 is useful for hauling materials on a variety of carts or wagons using a coupling hitch hook bar as a cart attaching mechanism. Meanwhile, the cart attaching mechanism US2004093650 is not able to freely move over a pivot point and is not suitable for hauling carts on an uneven support; e.g. over a doorstep.

Mobile robots are typically provided with one or several drive wheels, and one or several supporting wheels e.g. caster wheels.

A popular construction is to have a drive wheel placed in the middle of each of the two length sides of a preferably rectangular mobile robot chassis. Each drive wheel is driven by an individual controllable electric motor. Additionally, the robot is supported by four caster wheels; one at each corner of the chassis.

The mobile robot can drive in both directions and is steered by driving the drive wheels at a different speed or in opposite directions relative to each other. Patent application WO2016165721 discloses a robotic cart pulling vehicle for automated docking and pulling a cart, such as a wheeled hospital cart e.g. linen. In particular, the robotic vehicle is provided with gripping means for holding the cart. The vehicle has rectangular chassis, a drive wheel placed in the middle of each of the two length sides chassis, four caster wheels; one at each corner of the chassis.

Meanwhile the pulling power of a vehicle according to WO2016165721 is limited by the available friction between drive wheels and the support. If a better traction is needed for a certain application, the friction between drive the wheels and the support can be increased by adding extra weight on top of the robot. However, such extra weight would have negative effects on the overall energy efficiency and safety of the robot.

In a preferred version each of the two drive wheels is mechanically interconnected with a (front) caster wheel by a bogie arm. The robot chassis is supported at a pivoting point of the bogie arms and by a set of back caster wheels. Each drive wheel is driven by an individual controllable electric motor.

The bogie construction allows the robot to move across an uneven surface.

CN208774905U Registered utility model (and corresponding application CN108725626) shows an example of such basic construction. It illustrates an AGV with a drive wheel placed in the middle of each of the two length sides of a rectangular mobile robot chassis. Each drive wheel is driven by an electric motor. Additionally, the mobile robot is supported by four caster wheels; one at each corner of the chassis. Each of the two drive wheels is mechanically interconnected with a (front) caster wheel by a bogie arm. The robot chassis is supported at a pivoting point of the bogie arms and by a set of back caster wheels.

To drive (and stop) a mobile robot, including its possible top load and/or possible cart, without slipping, there must be certain friction between the drive wheels and the surface. The resulting friction between the drive wheel and surface is determined by the friction coefficient between the surface of the drive wheel and the surface of the floor, and the resulting gravitation force acting on the drive wheel.

Slipping of the drive wheels leads to inefficient transport and inefficient braking performance.

Further, the navigational system of a mobile robot typically is based on or at least supported an odometer receiving inputs from the drive motors, the driving gear, the driving axis and/or the driving wheels. Any slipping of the drive wheels, therefore, would lead to false information about the traveled distance.

CN208774905U suggests a set of adjustable preloaded springs between the chassis frame and the boogie arms. By adjusting the load of these springs, it is possible to change the distribution of gravitational forces acting on the drive wheels and on the front caster wheels, respectively. Hereby the friction between the drive wheel and the support can be increased. However, hereby the friction and eventually the contact between the front caster wheels and the support is decreased, which would have a negative effect on the driving/steering ability of the vehicle.

If the mobile robot itself, including the possible top load, does not have enough weight to provide the needed friction on the drive wheels in a given application, it is known to add extra weight on top of the mobile robot. However, any extra weight usually reduces the overall efficiency of the mobile robot and leads to shorter operation time between charging of the batteries of the robot.

Extra weight on top of the robot might also compromise the overall safety of the mobile robot. Adding extra weight might lead to a higher mass center point, which again might lead to a higher risk of the mobile robot tipping during braking.

On a mobile robot having 2 drive wheels and 4 caster wheels, any extra weight would act on the drive wheels, but also on at least one, and typically two, of the supporting caster wheels.

The added weight on the caster wheels does again increase the need for better traction on the drive wheels. Accordingly, relatively much weight needs to be added to get enough traction on the drive wheels. The extra weight increases the energy consumption of the mobile robot and might challenge the braking performance and might increase the risk of tilting.

It is the object of the present invention to improve upon the prior art and to provide a basic mobile robot on which the traction on the drive wheels relatively easily can be optimized for the intended application, without compromising the safety and with a minimal impact of the overall operational efficiency.

SUMMARY

The present invention provides an improved mobile robot for automatic docketing and towing/hauling carts and similar wagons from one position to another or for transporting a payload on top of the mobile robot. The mobile robot implements a navigation system for navigating on corridors. The navigation system preferably compromises an odometer receiving input from the drive motors. The mobile robot further comprises one or more sensors to indicate the position of the robot relative to the surroundings for avoiding unnecessary impacts.

With the inventive design of the bogie arm connecting the drive wheels and (front) caster wheels and the modular traction weight blocks, the gravitation forces and resulting friction acting on the drive wheels can be increased by attaching one or more weight modules to the bogie arm extensions, while due to the cantilever effect, the resulting gravitation forces acting on the (front) caster wheels are decreased. Thus, making it relatively easy to achieve just enough traction on the drive wheels for the intended application, without compromising safety and with a minimum impact on the overall energy efficiency of the mobile robot.

By having the mass center of the traction weight blocks at a level, which is lower than the gravitation center of the whole mobile robot, the risk of tipping during a braking or turning situation is decreased.

By having the mass center of the traction weight blocks lower than the pivot point of the bogie arm and as low as possible, the inertia of the traction weights helps to press the drive wheels downwards during braking, thereby increasing the friction and the braking performance of the drive wheels.

Thereby the invention makes it possible to easily optimize the traction, navigation, braking performance and safety of a mobile robot for a given application, with a minimum impact on the overall energy efficiency of the robot.

DESCRIPTION OF DRAWINGS

To understand the invention better and appreciate its practical applications, the following pictures are provided and referenced. Figures are given as examples only and in no way shall limit the scope of the invention.

DRAWINGS—REFERENCE NUMERALS

1 Mobile robot;
2 The preferred front-end of the mobile robot;
3 The preferred back-end of the mobile robot;
4 Bogie arm;
5 Pivot point of the bogie arm;
6 Drive wheel;
7 Front caster wheel;
8 Back caster wheel;
9 Traction weight block (comprising weight modules);

10 Electric motor/brake connected through a gearbox to the drive wheel;
11 Attachment holes for mounting traction weight block;
12 Bogie arm extension;
13 Weight modules of the traction weight block;
14 Chassis of the robot;
15 Top of the robot;
16 Housing (covering at least the sides of the mobile robot).
17 Top module or a load on the top of the robot.

DETAILED DESCRIPTION OF PREFERRED EMBODIMENTS

Figure 1A:
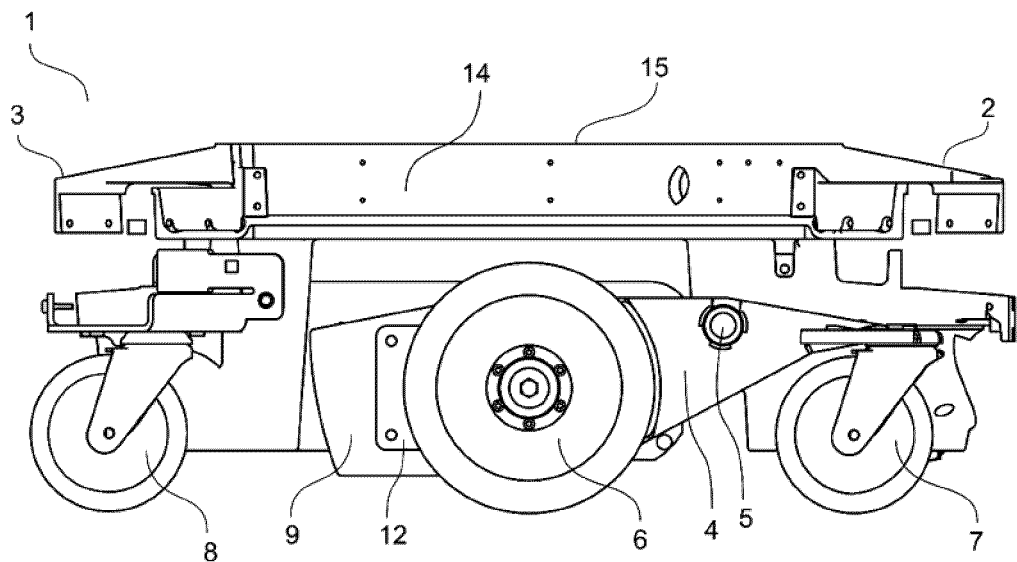
FIG. 1a depicts a mobile robot and right side bogie arm with a pivot point, back caster wheel, traction weight module, drive wheel, front caster wheel, and traction weight mounted on bogie arm extension.
Figure 1B:
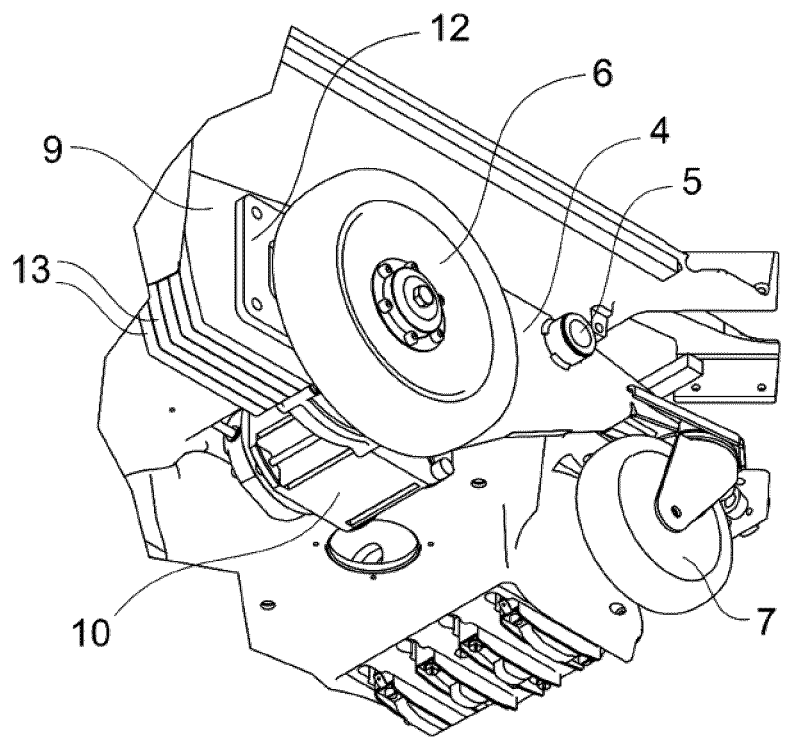
FIG. 1b presents the angled bottom-side/right-side view of the right-side drive wheel and right side front caster wheels.

This chapter describes the inventive design (FIG. 1 a, b) of the bogie arm 4 and the traction weight block 9, the gravitation forces and resulting friction acting on the drive wheels 6 can be increased by attaching one or more weight modules 13 to the bogie arm extension 12, while due to the cantilever effect, the resulting gravitation forces acting on the (front) caster wheels 7 are decreased. Thus making it relatively easy to achieve just enough traction on the drive wheels 6 for the intended application, without compromising safety and with a minimum impact on the overall energy efficiency of the mobile robot 1.

Figure 2A:
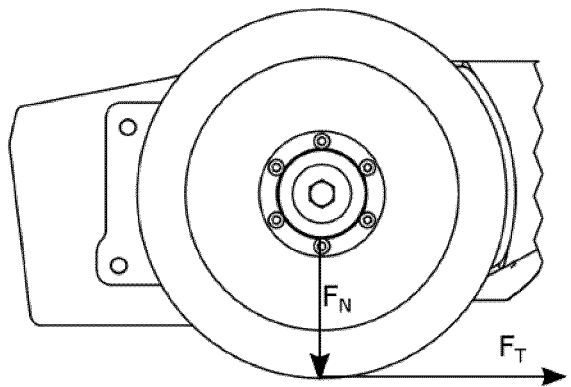
FIG. 2a presents available traction of the drive wheel of the mobile robot which is proportional to the normal force on the ground generated by the gravitational force of the robot and dependent on the friction coefficient between the ground and the wheel thread.

The available traction of the drive wheels 6 of the mobile robots is proportional to the normal force on the ground generated by the gravitational force of the robot and dependent on the friction coefficient between the ground and the wheel thread (FIG. 2a):

$$F_T = F_N * \mu$$

where $\mu$ is the friction coefficient; $F_N$ is the normal force.

Figure 2B:
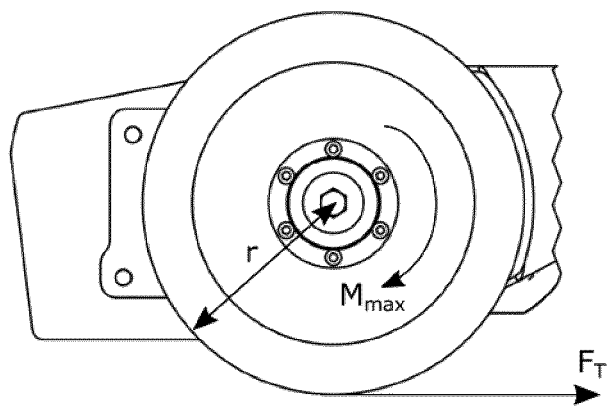
FIG. 2b presents the maximum torque that can be transferred to the ground by the drive wheel.

The robot drive wheels are able to transfer torque accordingly. The maximum torque that can be transferred to the ground by the drive wheel (FIG. 2b) can be described by:

$$M_{max} = F_T * r$$

where r is the radius of the drive wheel.

The torque is generated by an electric motor or brake connected through a gearbox to the drive wheel. If the torque is higher than $M_{max}$ the wheel will be slipping the on the ground surface.

Figure 2C:
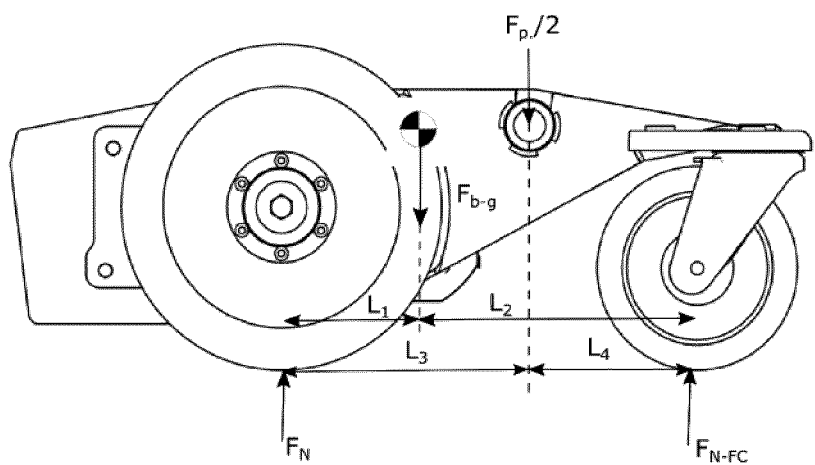
FIG. 2c presents that the normal force from the drive wheel on the ground comes from the weight of the robot pressuring on the pivot points of the bogies and the gravitational force of the bogies themselves.

The normal force $F_N$ from the drive wheel on the ground comes from the weight of the robot pressuring on the pivot points of the bogies and the gravitational force of the bogies themselves (FIG. 2c):

$$F_N = \frac{\frac{F_P}{2} * L_4}{L_3 + L_4} + \frac{F_{g-b} * L_2}{L_1 + L_2}$$

$$F_{N-FC} = \frac{\frac{F_P}{2} * L_3}{L_3 + L_4} + \frac{F_{g-b} * L_1}{L_1 + L_2}$$

where:
$L_1, L_2, L_3, L_4$ are distances to reaction forces;
$F_P$ is the force from the gravity of the robot without bogies on the bogie pivot points. It is assumed the load is distributed equally between left and right bogie, which is why $F_P$ is divided by 2 in the calculation;
$F_{g-b}$ is the force from the gravity of bogie;
$F_{N-FC}$ is the normal force on the ground from front caster wheel.

Figure 2D:
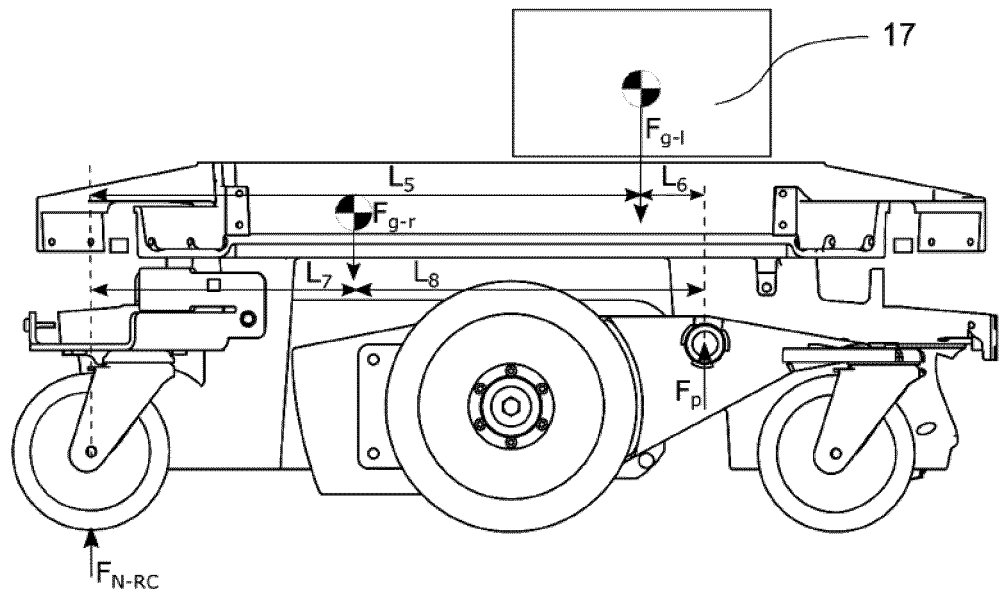
FIG. 2d The force in the pivot point comes from the load on the robot and the robot mass.

The force in the pivot point comes from the load on the robot and the robot mass (FIG. 2d):

$$F_P = \frac{F_{g-l} * L_5}{L_5 + L_6} + \frac{F_{g-r} * L_7}{L_7 + L_8}$$

$$F_{N-RC} = \frac{F_{g-l} * L_6}{L_5 + L_6} + \frac{F_{g-r} * L_8}{L_7 + L_8}$$

where:
$F_{g-l}$ is force from the gravity of load;
$F_{g-r}$ is force from the gravity of robot without bogies;
$F_{N-RC}$ is normal force on the ground from the back caster wheel.

Figure 2E:
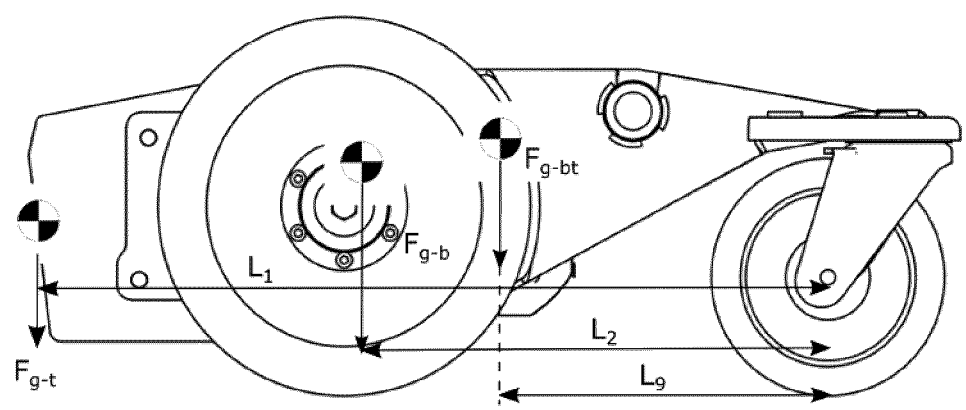
FIG. 2e presents adding a set of traction weight blocks on a set of bogie arm extensions behind the drive wheels, the force from gravity acting on the drive wheels is increased, while the force of gravity acting on the front caster wheels is decreased.
Figure 3A:
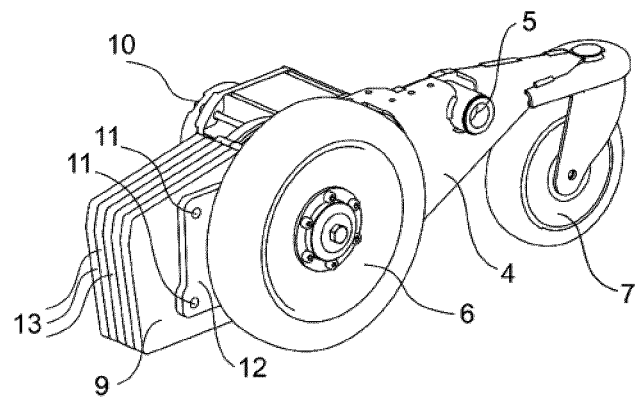
FIG. 3a-c presents different aspect views (a, b, c) of the right side bogie arm with a pivot point, back caster wheel, traction weight block, drive wheel, front caster wheel, mounted on the bogie arm extension: (a) view of the bogie arm from the outer side, (b) view of the bogie arm from the inner side, (c) view of the bogie arm from the right side and from below of the robot, showing the housing that covers the bogie arm from the right side.
Figure 3B:
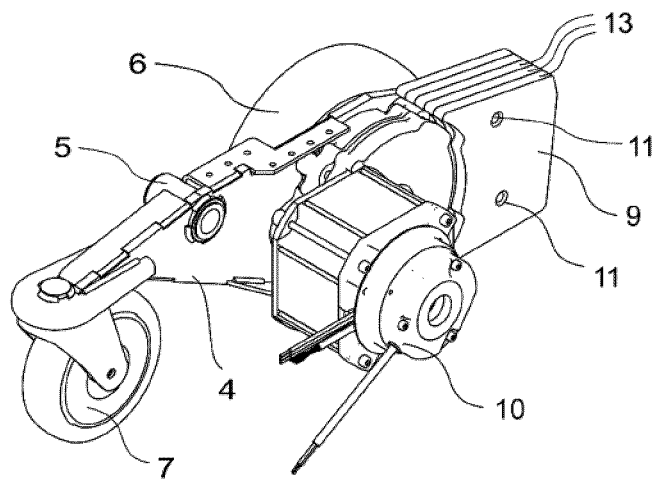
Figure 3C:
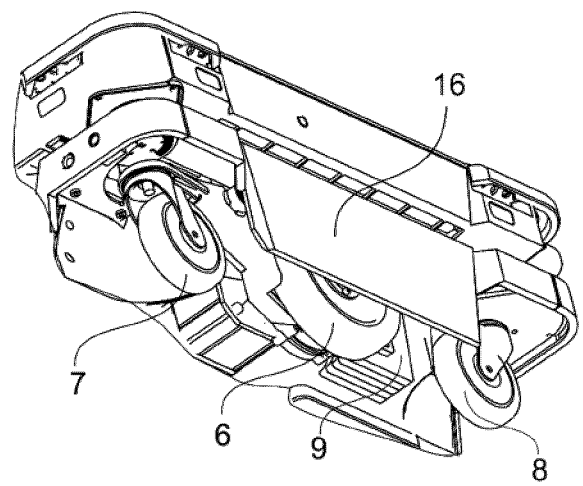

When adding a set of weight modules 13 on a set of bogie arm extensions 12 behind the drive wheels 6, the force from gravity acting on the drive wheels 6 is increased, while the force of gravity acting on the front caster wheels 7 is decreased (FIG. 2e). Hereby enough traction can be achieved with a no or at least a minimum impact on the performance and without compromising the safety of the robot.

$$F_{g-b} = F_{g-bt} + F_{g-t}$$

$$L_2 = \frac{F_{g-bt} * L_9 + F_{g-t} * L_{10}}{F_{g-b}}$$

where:
$F_{g-t}$ is the force from the gravity of the traction weight block 9;
$F_{g-bt}$ is the force from the gravity of bogies without traction weights.

By mounting the traction weight blocks 9 directly on the bogie arm extensions 12, the overall mass of the mobile robot 1 can be significantly reduced and still get the right traction force as if larger loads 17 were placed on top surface 15 of the mobile robot 1.

When reducing the total mass of the mobile robot 1 the efficiency is improved and hereby battery operation time is increased as the drivetrain is one of the main consumers for the battery.

Specifically, a preferred embodiment of the invention provides:
a mobile robot 1 having a chassis 14 with preferred front end 2 and preferred back end 3, the mobile robot comprising:
  a pair drive wheels 6 at the center of the mobile robot 1,
    where the set of drive wheel 6 coupled to a set of drive motors 10, preferably via a driving axis and a gearbox,
      each drive motor 10 being individually controllable in both directions by a control system of the mobile robot, allowing the robot 1 to drive in both directions and make 360 degrees turns (approximately) around its vertical center axis;
  a pair of (front) caster wheels 7 at the corners of the one (preferred front) end of the mobile robot 1;
  a set of (back) caster wheels 8 at the other (preferred back) end of the mobile robot 1:
    where the pair of drive wheels 6 are mechanically interconnected with a pair of (front) caster wheels 7 by a pair of bogie arms 4 having a pivot point 5,
    a robot chassis 14 supported by the bogie arms 4 at the pivot point 5 and by the two (back) caster wheels 8, where bogie arms 4 have a bogie arm extensions 12 protruding behind (seen from the preferred front end 2 of the mobile robot) the axis of the driving wheels 6,
where the bogie arm extension 12 is adapted for mounting traction weight blocks 9 comprising one or more weight modules 13;
a top surface 15 adapted for mounting of various top modules or loads 17 on to the chassis of the robot 14;
where the optional types of top modules 17 may comprise;
an attaching mechanism for coupling a cart or wheeled inventory, a holder to said mobile robot,
a transport platform, box, or shelf,
a manipulator such as a robotic arm,
a lifting mechanism, for lifting a pallet or and inventory holder
and/or a conveyor mechanism for loading/unloading of items;
a housing 16 covering at least the sides of the mobile robot 1, where at least parts of the housing 16 at the sides of the robot are detachable, in order to provide easy access to the one or more traction weight blocks 9.

In alternative embodiments, the exact form of the bogie arm extensions 12 can be adapted to the size and shape of the mobile robot 1 and its intended application. The length and form of the part of the bogie arm extensions 12, carrying the traction weight blocks 9 can be variated to allow different numbers, types and sizes of weight modules 13 to be attached.

The traction weight blocks 9 are preferably designed as one or more weight modules 13, preferably metal plates, adapted to be fixed to the bogie arm extensions 12.

Figure 4:
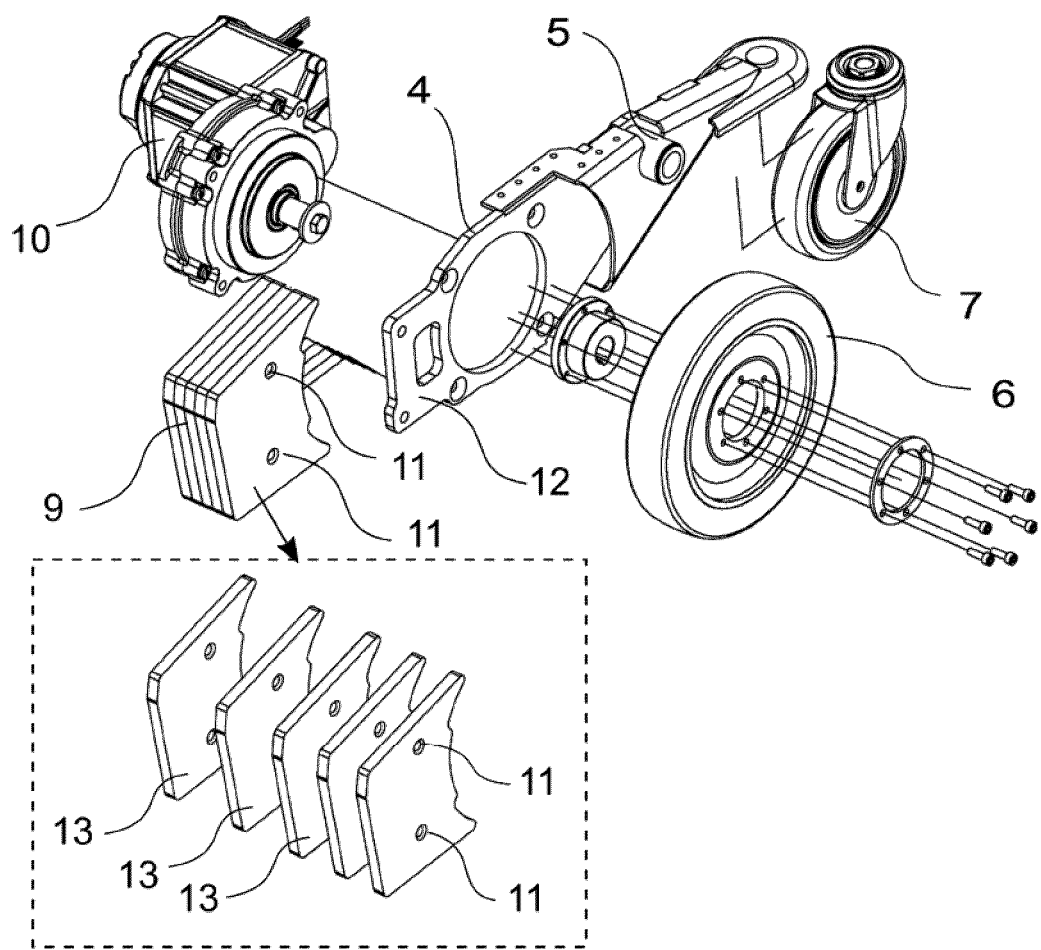
FIG. 4 exploded view, showing the right side drive motor including the gearbox of the drive motor, the whole bogie arm, with its pivoting point and the bogie arm extension adapted for attachments of traction weight block, the front caster wheel, the drive wheel, the bearing for the drive wheel, the means (ring and screws) for attaching the driving wheel, and a traction weight block consisting of 5 weight modules with an aligned set of bolt holes, which can be aligned to a matching set of holes in the bogie arm extensions, for bolting the weight modules to the bogie arm extension. One end of the traction weight block, and the weight modules, respectively is shaped so that it fits the gearbox of the drive motor.

The bogie arm extensions 12 and the weight modules 13 preferably are provided with one or more aligned holes 11 for fixing an optimal number of weight modules 13 to the bogie arm extensions 12 by a set of bolts and nuts (FIG. 4).

In a preferred embodiment, one end of the one or more traction weight blocks 9 has a shape fitting to the shape of the driving motor 10 and/or possible gear box, so that the available space for placing extra weight modules 13 can be utilized.

Further, the bogie arm extensions 12 can be adapted to allow the traction weight blocks 9 to be attached to the bogie arm 4 at different distances from the center of the driving wheel 6. Thus, allowing optimization of traction of the drive wheels 6 for a given application of the mobile robot 1, by adding a minimum of extra weight to the mobile robot 1.

With this solution it is achieved that the adding of weight does increase the traction on the drive wheels without increasing the friction of the supporting caster wheels. Further it is achieved that the breaking performance is increased, while the risk of tilting is decreased.

CITATION LIST

Patent Literature

Patent application US2004093650A1/Patent US7066291B2. G. Martins et al. Robot system.
Patent application WO2016165721. Niels Jul Jacobsen. Robotic cart pulling vehicle for automated pulling of carts
Registered utility model CN208774905U/application CN108725626. Zeng Chao. A kind of chassis structure of AGV.

The invention claimed is:

1. A mobile robot comprising:
a chassis comprising a front end and a back-end;
driver motors,
drive wheels coupled to the driver motors;
front caster wheels at the front end;
back caster wheels at the back end;
bogie arms, each bogie arm coupling a drive wheel and a front caster wheel, each bogie arm having a pivot point, each bogie arm comprising an extension behind the drive wheel; and
one or more traction weight blocks mounted to each extension, wherein the chassis is supported by the bogie arms at the pivot point and by the back caster wheels, wherein the one or more traction weight blocks comprise one or more weight modules for enabling a configurable weight allocation to each bogie arm extension.

2. The mobile robot of claim 1, wherein the one or more traction weight blocks and the one or more weight modules have shapes adapted to shapes of the driver motors or to shapes of gearboxes for the drive wheels.

3. The mobile robot of claim 1, wherein each driver motor is controllable to operate the drive wheels in different directions by a control system of the mobile robot.

4. The mobile robot of claim 1, wherein the chassis comprises a top surface for mounting a top module on the mobile robot.

5. The mobile robot of claim 1, further comprising an axle to couple the drive wheels to the driver motors.

6. The mobile robot of claim 1, further comprising a gearbox to couple the drive wheels to the driver motors.

7. The mobile robot of claim 1, further comprising both an axle and a gearbox to couple the drive wheels to the driver motors.

8. The mobile robot of claim 1, wherein the drive wheels comprise a pair of drive wheels, the front caster wheels comprise a pair of front caster wheels, and the back caster wheels comprise a pair of back caster wheels.

9. The mobile robot of claim 1, wherein the one or more weight modules comprise metal plates.

10. A mobile robot comprising:
a chassis comprising a front end and a back-end;
driver motors;
drive wheels coupled to the driver motors;
front caster wheels at the front end;
back caster wheels at the back end;
bogie arms, each bogie arm coupling a drive wheel and a front caster wheel, each bogie arm having a pivot point, each bogie arm comprising an extension behind the drive wheel; and
one or more traction weight blocks mounted to each extension, wherein the chassis is supported by the bogie arms at the pivot point and by the back caster wheels, wherein the extension is adaptable to allow the one or more traction weight blocks to be attached to a corresponding bogie arm at different distances from a center of a corresponding driving wheel.

11. A mobile robot comprising:
a chassis comprising a front end and a back-end:
driver motors;
drive wheels coupled to the driver motors;
front caster wheels at the front end;
back caster wheels at the back end;

bogie arms, each bogie arm coupling a drive wheel and a front caster wheel, each bogie arm having a pivot point, each bogie arm comprising an extension behind the drive wheel; and one or more traction weight blocks mounted to each extension, wherein the chassis is supported by the bogie arms at the pivot point and by the back caster wheels, wherein a mass center of each traction weight block is at a level lower than a gravitation center of the mobile robot, wherein the mass center of each traction weight block is at a level lower than the fall pivot point of each bogie arm.

12. A mobile robot comprising:
a chassis comprising a front end and a back-end;
driver motors;
drive wheels coupled to the driver motors;
front caster wheels at the front end;
back caster wheels at the back end;
bogie arms, each bogie arm coupling a drive wheel and a front caster wheel, each bogie arm having a pivot point, each bogie arm comprising an extension behind the drive wheel;
one or more traction weight blocks mounted to each extension, wherein the chassis is supported by the bogie arms at the pivot point and by the back caster wheels; and
a housing covering at least sides of the mobile robot, where at least part of the housing at the sides are detachable.

13. A mobile robot comprising:
a chassis comprising a front end and a back-end;
driver motors;
drive wheels coupled to the driver motors;
front caster wheels at the front end;
back caster wheels at the back end;
bogie arms, each bogie arm coupling a drive wheel and a front caster wheel, each bogie arm having a pivot point, each bogie arm comprising an extension behind the drive wheel; and
one or more traction weight blocks mounted to each extension, wherein the chassis is supported by the bogie arms at the pivot point and by the back caster wheels, wherein the chassis comprises a top surface for mounting a top module on the mobile robot, wherein the top module comprises at least one of:
an attaching mechanism for coupling a cart or wheeled inventory holder to the mobile robot;
a transport platform, box or shelf;
a manipulator;
a lifting mechanism for lifting a pallet or an inventory holder; and
a conveyor mechanism for loading/unloading items.

14. A mobile robot comprising:
a chassis comprising a front end and a back-end;
driver motors;
drive wheels coupled to the driver motors;
front caster wheels at the front end;
back caster wheels at the back end;
bogie arms, each bogie arm coupling a drive wheel and a front caster wheel, each bogie arm having a pivot point, each bogie arm comprising an extension behind the drive wheel; and
one or more traction weight blocks mounted to each extension, wherein the chassis is supported by the bogie arms at the pivot point and by the back caster wheels, wherein the chassis comprises a top surface for mounting a top module on the mobile robot, wherein the top module comprises a manipulator, wherein the manipulator comprises a robotic arm.

15. A mobile robot comprising:
a chassis comprising a front end and a back-end;
driver motors;
drive wheels coupled to the driver motors;
front caster wheels at the front end;
back caster wheels at the back end;
bogie arms, each bogie arm coupling a drive wheel and a front caster wheel, each bogie arm having a pivot point, each bogie arm comprising an extension behind the drive wheel; and
one or more traction weight blocks mounted to each extension, wherein the chassis is supported by the bogie arms at the pivot point and by the back caster wheels, wherein the one or more traction weight blocks are directly mounted to each extension.

16. A mobile robot comprising:
a chassis comprising a front end and a back-end;
driver motors;
drive wheels coupled to the driver motors;
front caster wheels at the front end;
back caster wheels at the back end;
bogie arms, each bogie arm coupling a drive wheel and a front caster wheel, each bogie arm having a pivot point, each bogie arm comprising an extension behind the drive wheel; and
one or more traction weight blocks mounted to each extension, wherein the chassis is supported by the bogie arms at the pivot point and by the back caster wheels, wherein each extension comprises one or more holes for mounting one or more weight modules.

17. A mobile robot comprising:
a chassis comprising a front end and a back-end;
driver motors;
drive wheels coupled to the driver motors;
front caster wheels at the front end;
back caster wheels at the back end;
bogie arms, each bogie arm coupling a drive wheel and a front caster wheel, each bogie arm having a pivot point, each bogie arm comprising an extension behind the drive wheel;
one or more traction weight blocks mounted to each extension, wherein the chassis is supported by the bogie arms at the pivot point and by the back caster wheels; and
a navigation system comprising an odometer to receive input from the driver motors, the navigation system for navigating corridors based on the input.

18. A mobile robot comprising:
a chassis comprising a front end and a back-end;
driver motors;
drive wheels coupled to the driver motors;
front caster wheels at the front end;
back caster wheels at the back end;
bogie arms, each bogie arm coupling a drive wheel and a front caster wheel, each bogie arm having a pivot point, each bogie arm comprising an extension behind the drive wheel;
one or more traction weight blocks mounted to each extension, wherein the chassis is supported by the bogie arms at the pivot point and by the back caster wheels; and
one or more sensors for use by the mobile robot in avoiding impacts in surroundings of the mobile robot.

* * * * *